United States Patent [19]
Kiraly

[11] Patent Number: 5,308,092
[45] Date of Patent: May 3, 1994

[54] SHAFT QUICK HITCH

[76] Inventor: William Kiraly, 1641 Roselawn Rd., Mayfield Heights, Ohio 44124

[21] Appl. No.: 919,452

[22] Filed: Jul. 27, 1992

[51] Int. Cl.$^5$ .............................. B62C 5/00; B68B 5/00
[52] U.S. Cl. ..................................... 278/118; 278/126; 278/128; 54/2; 54/50
[58] Field of Search .................. 280/63; 278/118, 126, 278/128; 54/2, 50

[56] References Cited

U.S. PATENT DOCUMENTS

| | | | |
|---|---|---|---|
| 132,855 | 11/1872 | Patterson | 54/2 |
| 498,684 | 5/1893 | Norwood | 278/118 |
| 4,033,598 | 7/1977 | King | 280/63 |
| 4,480,428 | 11/1984 | Gilbertson | 54/2 |

Primary Examiner—David H. Bollinger
Attorney, Agent, or Firm—Renner, Kenner, Greive, Bobak, Taylor & Weber

[57] ABSTRACT

Hitch for securing a racing sulky to a harness or saddle of a horse. The hitch has an elongated, generally cylindrical body which includes a frustoconical tapered front portion, a generally cylindrical mid-portion and a cylindrical rear portion of slightly smaller diameter than that of the mid-portion so as to form a shoulder. The rear portion is adapted to be inserted into the open end of a tubular shaft, such as a shaft of a racing sulky. When so inserted, the hitch may be permanently secured to the shaft. The mid-portion of the hitch includes cylindrical front and rear end members which adjoin the front portion and the rear portion respectively of the hitch. The mid-portion of the hitch has one or more cutouts which define a longitudinally extending rigid strut and (when there is more than one such cutout) one or more transverse spacer discs, which are spaced from the end members and from each other. A rigid rod extends through the rear portion and the mid-portion of the hitch. The strut and the rigid rod (and the spacer discs when present) together define one or more slotted openings for receiving a strap or the like which is associated with a harness or saddle. Preferably the entire hitch except for the rigid rod is formed from a single piece of material; the rigid rod may be formed from a second piece of material and joined to the remaining structure. Either metal (such as steel or aluminum) or rigid plastic can be used for forming the hitch.

10 Claims, 3 Drawing Sheets

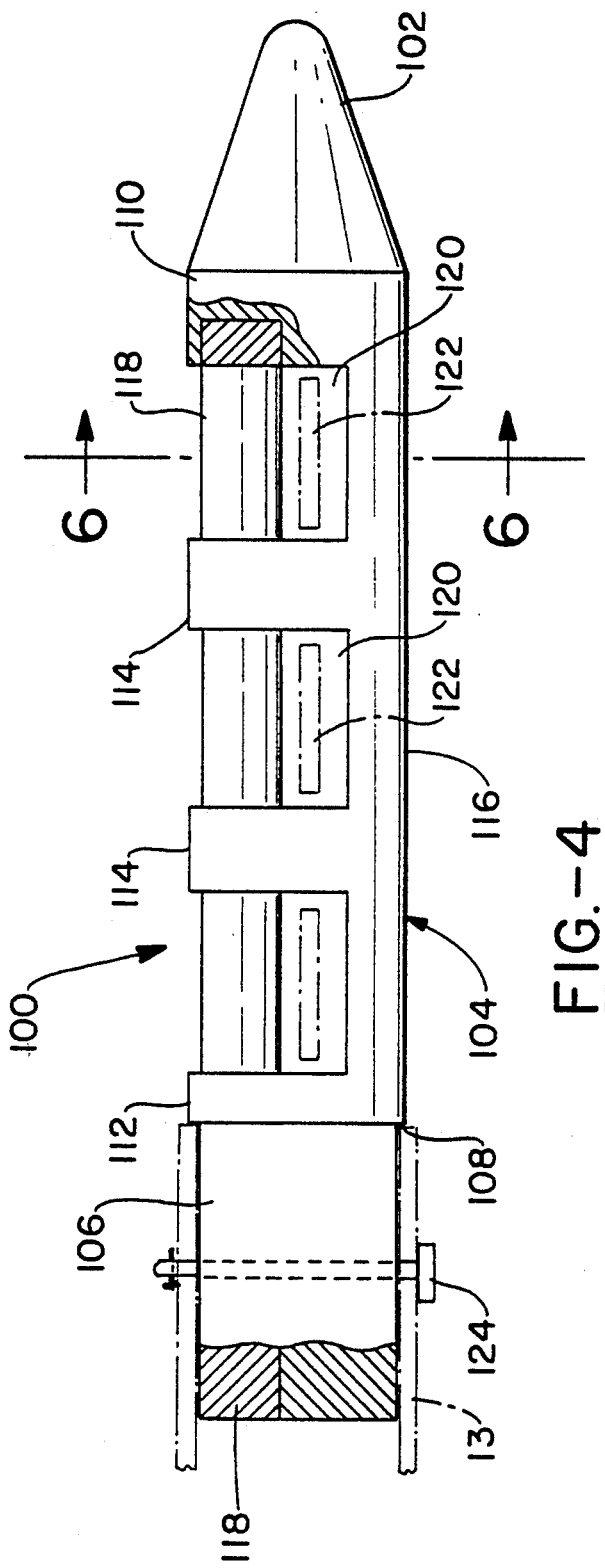

SHAFT QUICK HITCH

FIELD OF THE INVENTION

This invention relates to a hitch for securing the forward ends of the shafts of a racing sulky to a harness or saddle of a horse. More particularly, this invention relates to a hitch which is of improved aerodynamic design and which permits quicker attachment and detachment of a sulky to a saddle or harness than is the case with hitches or other attaching means presently known.

BACKGROUND OF THE INVENTION

Various hitches and other means for securing the shafts of a racing sulky to a saddle or harness of a horse are known. Presently known hitches and other securing means suffer from at least two disadvantages. First, they do not permit rapid attachment or detachment of the shafts to or from a harness or saddle. Second they have wind resistance because they are not aerodynamically designed.

SUMMARY OF THE INVENTION

This invention according to one aspect provides a hitch of improved design which permits a sulky to be more rapidly secured to and detached from the saddle or harness of a horse than is the case with presently known hitches and other attachment means. The hitch of this invention is also of improved aerodynamic design, offering less wind resistance than presently known hitches.

The hitch of this invention is an elongated, generally cylindrical structure having a longitudinal axis and including a tapered front portion, a generally cylindrical mid-portion, and a cylindrical rear portion which is adapted to be received in an open tubular end of a tubular shaft, and in particular in an open front end of a tubular shaft of a racing sulky. The mid-portion includes spaced first and second longitudinally extending rigid members which together form longitudinally extending opening means (i.e., one or more longitudinally extending slotted openings) for receiving an attaching member (such as a strap) which is associated with a harness or saddle of a horse.

The preferred hitch of this invention is one in which the mid-portion is generally cylindrical and of slightly larger diameter than the diameter of the rear portion so as to form a shoulder for positioning the hitch in the forward end of a shaft. The mid-portion includes first and second cylindrical end members or sections which adjoin the front and rear portions, respectively, and optionally (and preferably) one or more spacer discs which are spaced from the end members and from each other (when there is more than one spacer disc). The first longitudinally extending rigid member is a strut which extends from the front end member to the rear end member of the mid-portion. The entire hitch structure, except for the second longitudinally extending rigid member, is preferably of one piece integral construction. The second longitudinally extending rigid member is preferably a rigid rod which extends from the front portion to the back portion of the hitch and is joined thereto.

This invention according to another aspect provides a racing sulky having longitudinally extending shafts which have tubular forward end portions which are open at the ends, a transverse member to which the longitudinal shafts are joined, wheels which are rotatably mounted on the transverse member, and a pair of hitches of this invention. One such hitch is received in the open tubular forward end portion of each shaft.

BRIEF DESCRIPTION OF THE DRAWINGS

In the drawings:

FIG. 4 is a top plan view, shown partly in section, of a hitch according to this invention.

FIG. 5 is a rear elevational view of the hitch shown in FIG. 4.

FIG. 6 is a cross-sectional view, taken along line 6—6 of FIG. 4.

DETAILED DESCRIPTION OF THE PREFERRED EMBODIMENTS

This invention will now be described in detail with reference to the preferred embodiment thereof.

Figure 1:
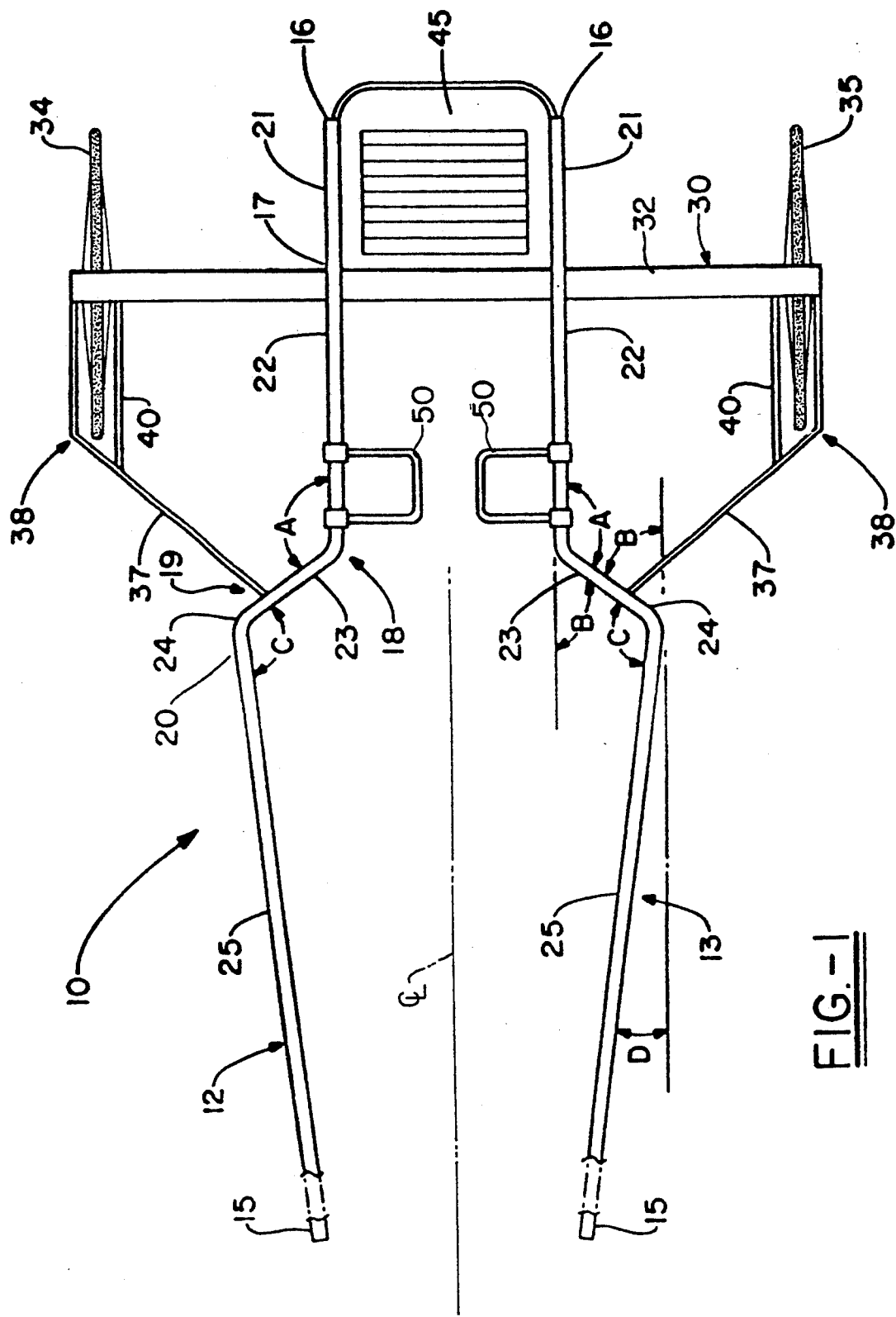
FIG. 1 is a top plan view of a preferred sulky with which the hitches of the present invention can be used.
Figure 2:
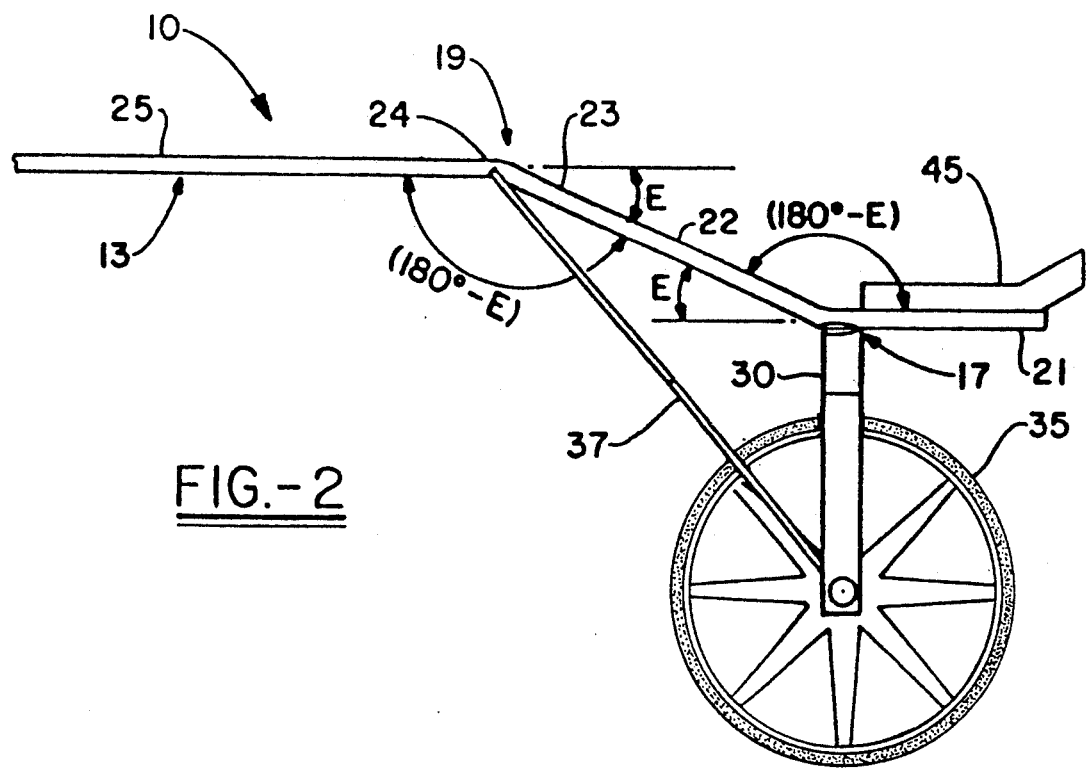
FIG. 2 is a side view of the sulky shown in FIG. 1.
Figure 3:
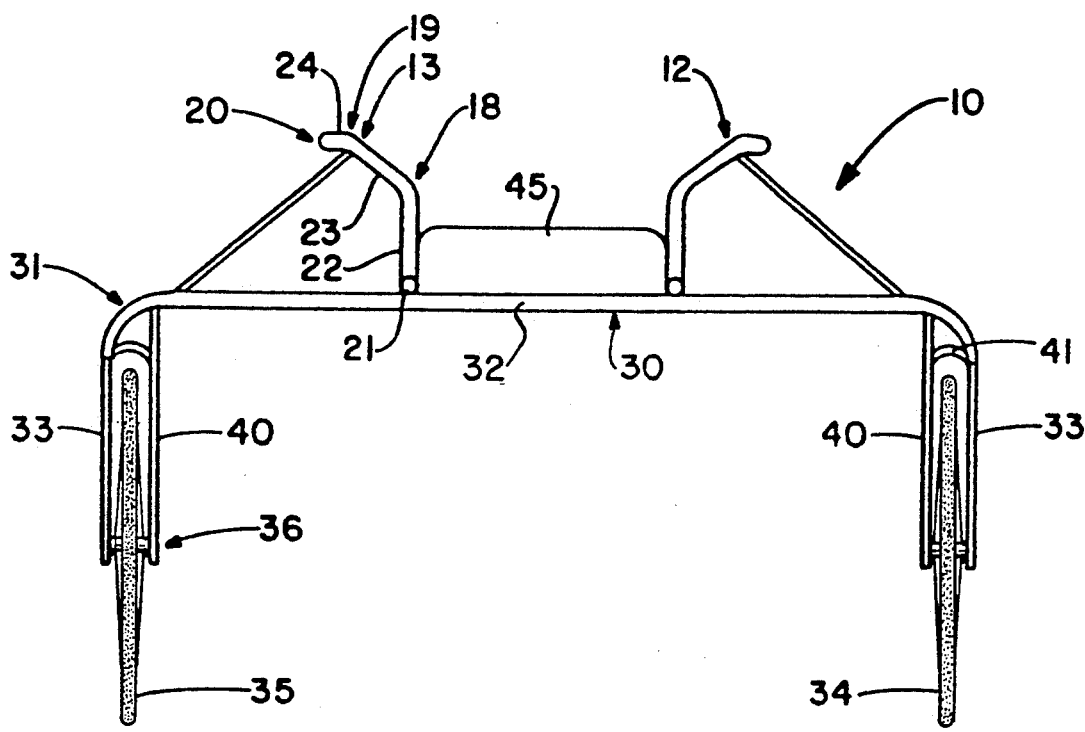
FIG. 3 is a rear view of the sulky shown in FIG. 1.

FIGS. 1-3 show a racing sulky with which the hitch of the present invention can be used. Briefly, this racing sulky comprises a pair of generally longitudinally extending and spaced apart tubular shafts 12 and 13. These shafts are mirror images of each other and are symmetrically disposed on opposite sides of a longitudinally extending center line CL. Each of the shafts 12 and 13 have two opposite ends, namely, a forward distal end 15, which is open, and a back end 16. The back end 16 is at or near the rear of the sulky.

Sulky 10 further comprises a generally U-shaped transverse member 30 positioned normal to the center line (CL) of the sulky near the back of the sulky. Wheels 34 and 35 are rotatably mounted on the outboard lateral ends of this transverse member 30.

This brief description of the sulky 10 is given at this point in the specification in order to provide a frame of reference for the hitches of this invention. The sulky will be described subsequently in greater detail. The sulky illustrated is a preferred sulky for utilization of the hitches of the present invention, and is described in greater detail and claimed in applicant's earlier filed co-pending application Ser. No. 07/900,900, filed Jun. 18, 1992. It will be understood that this preferred sulky will be described only for the purposes of illustration, since the hitches of the present invention can be used with any racing sulky which has longitudinally extending tubular shafts, or at the very least, which has longitudinally extending spaced shafts having forward end portions which are open at the forward ends.

The preferred hitch 100 of the present invention will now be described with reference to FIGS. 4-6.

Referring now to FIG. 4, the shaft quick hitch 100 of the present invention is formed from a one-piece generally cylindrical body. This body is preferably metallic, e.g., aluminum or stainless steel, although a rigid and preferably reinforced plastic can be used. The hitch 100 has a longitudinal axis and comprises a tapered and preferably frustoconical front portion 102, a generally cylindrical mid-portion 104, and a cylindrical rear portion 106. The rear portion 106 is preferably a slightly smaller diameter than that of the mid-portion 104, forming a narrow annular shoulder 108 which serves to position the hitch 100 in the open front end of a tubular shaft 12 or 13.

The frustoconical front portion 102 is tapered from back to front in the interest of improved aerodynamics. The forward end or tip of front portion 102 is of relatively small diameter. The diameter of front portion 102 increases from front to back, reaching its maximum, diameter, which is equal to that of the mid-portion 104, at the plane of juncture between the front portion 102 and the mid-portion 104.

The mid-portion 104 of the hitch 100 is generally cylindrical and comprises a transverse cylindrical front end member or section 110, and a transverse cylindrical back end member or section 112 which is spaced from the front end member 110. The front end member 110 and the back end member 112 are positioned next to and integrally joined to the tapered front (or nose) portion 102 and the rear portion 106, respectively.

The preferred hitch 100 of this invention further comprises a pair of transverse cylindrical spacer discs 114, which are spaced from the front and back end members 110 and 112, respectively and from each other.

The mid-portion 104 further comprises a longitudinally extending rigid strut 116 which extends from the front end member 110 to the back end member 112 of the mid-portion 104 of the hitch, (i.e. essentially the entire length of mid-portion 104). Spacers 114 (when present) extend laterally from the strut 116 and divides the strut into a plurality of segments. The preferred strut shown has three segments.

The front member 110, rear member 112, and transverse spacer discs 114 are coaxial of circular cross-sectional shape and of the same diameter. The spacer discs 114 and strut 116 are formed and defined by cut-outs in the mid-portion 104. (The number of such cut-outs is one greater than the number of spacers)

Strut 116 is of generally rectangular cross-section. Actually the preferred strut 116 has three planer surfaces and a fourth surface with is arcuate or cylindrical. The arcuate or cylindrical surface is a continuation of the arcuate or cylindrical surfaces of the front end member 110, the back end member 112, and the spacers 114. The entire hitch 100, with the exception of rod 118 is preferably formed from a single piece of material, e.g., a metal such as aluminum or stainless steel, or a rigid and preferably a reinforced plastic. The mid-portion 104 has cut out portions which define the strut 116 and the spacer discs 114. The body of hitch 100 can be formed by milling or by casting when the hitch is made of metal; molding or casting is used when the hitch body is made of a rigid plastic.

A longitudinally extending rigid rod 118 extends from the back end of the hitch 100 (i.e., the back surface of rear portion 106 of hitch 100) as seen in FIG. 5, through bores in the rear portion 106, the back end section 112 of mid-portion 104, and spacers 114, and terminates in a closed end or blind bore in the front end member 110. Rod 118 (which is illustrative of the second longitudinally extending rigid member referred to earlier) is preferably made of a metal such as stainless steel or aluminum, but can be made of wood if desired. This rod is fabricated separately from the rest of the hitch and is then inserted into the hitch through the above described bores, and is then permanently joined (e.g. by adhesive, or by welding when a metal rod is provided) so that the hitch 100 is a unitary structure.

The strut 116 and the rod 118 define therebetween longitudinally extending opening means 120, which are adapted to receive a strap 122 (shown in phantom lines) or other attaching members associated with a harness or saddle for a horse. Spacer discs 114 divide the opening means into a plurality of longitudinally extending slotted openings 120 (three such openings are shown). The preferred embodiment shown has two spacer discs 114 and therefore three such openings 120.

The rear portion 106 of hitch is cylindrical and of circular cross-section, and is coaxial with the front portion 102 and mid-portion 104. The diameter of rear portion 106 is just slightly less than the inside diameter of tubular shafts 12 and 13, so as to afford a small clearance for insertion of a hitch 100 into the open forward end of a tubular shaft 12 or 13.

To put the hitch 100 into service, the rear portion 104 is inserted into an open end of a tubular shaft (say the forward end 15 of a tubular shaft 13), as shown in phantom lines in FIG. 4, until the end of the tubular shaft abuts the shoulder 108. The inside diameter of the tubular shaft should be just slightly larger than the outside diameter of the rear portion 106 of the hitch. The hitch should be oriented so that the strut 116 and the rod 118 will be at the same level (so that openings 120 are vertical), preferably with the strut 116 to the outside away from the horse. Once the back or rear portion 106 of the hitch 100 has been so inserted, the hitch is held in place by means of a pin 124 or a screw or bolt or the like, which passes transversely as shown in FIG. 4 through the annular wall of shaft 12 or 13 and through the rear portion 106 of the hitch 100. A transverse bore is provided in the rear portion 106 of hitch 100 for this purpose.

Two hitches 100 are required for each racing sulky. One hitch is inserted into the open forward end of shaft 12; the other hitch is inserted into the open forward end of shaft 13.

A representative and preferred sulky 10 with which the hitch of the present invention may be used will now be described in further detail with respect with FIGS. 1-3. It will be understood that these details of the sulky are merely illustrative and do not constitute a part of the present invention.

Each shaft 12 and 13 includes a plurality of spaced bends. These bends, from the back end 16 to the forward end 15, are: an upward bend 17 (See FIG. 2), an outward bend 18 (See FIG. 1), a downward bend 19, and an inward bend 20. These bends divide shafts 12 and 13 into a plurality of segments, namely, a longitudinally extending horizontal or level rear segment 21 which includes the back end 16 of the shaft, an upwardly extending longitudinal segment 22, an upwardly and outwardly extending segment 23, a short horizontal and outwardly extending segment 24, and a comparatively long, generally longitudinally extending but preferably slightly inwardly extending, horizontal forward segment 25 which terminates in the forward distal end 15. These segments have been listed in order from the back end 16 to the forward end 15 of the shaft.

Shafts 12 and 13 are unitary structures in which adjacent segments are integrally jointed together at the bends. The bends define the boundaries between adjacent segments.

Bends 17 and 19 are vertical and bends 18 and 20 are horizontal. None of the bends has both a horizontal and a vertical component. This simplifies visualization and fabrication of shafts 12 and 13.

Segments 21 and 22 extend longitudinally, parallel to the centerline (CL). Segment 21 is horizontal and segment 22 extends upwardly and forwardly at an elevation angle E. Segments 21 and 22 together constitute longitudinally extending rear portions of shafts 12 and 13. Segments 21 and 22 of respective shafts 12 and 13 are comparatively close together, just far enough apart to receive a driver's seat between them. The lateral distance between the rear portions (segments 21 and 22) of the respective shafts 12 and 13 is less than the width of the body of a horse of a size for which the sulky is intended. This reduces wind resistance as will be further explained. The rear portions of the shafts should be far enough apart to receive the driver's legs therebetween, but not so far apart as to necessitate the driver's spreading his or her legs significantly in order to put his or her feet into the stirrups (to be described subsequently). The respective rear portions of shafts 21 and 22 are closer together than any other portions of the respective shafts. Specifically, these respective rear portions are closer together than the forward distal ends 15 of the shafts.

The shafts 12 and 13 bend outwardly at bend 18. The next two (2) shaft segments 23 and 24 extend outwardly and forwardly at an acute angle B, which is the angle of divergence between the direction of segments 23 and 24 as seen in plan view (FIG. 1) in the longitudinal direction. Angle B is the supplement of obtuse angle A which is the actual angle between adjacent segments 22 and 23 as seen in plan view (FIG. 1). Angle B is illustrated in FIG. 1 as the angle between segment 23 and axis 21, which is a horizontal longitudinal axis aligned with segments 21 and 22. Segment 23 extends upwardly at elevation angle E and segment 24 is horizontal, as shown in FIG. 2. Shafts 12 and 13 at bends 20 and forward thereof to the distal forward ends 15 are far enough apart to accommodate a horse between the two (2) shafts. Bends 20 are positioned to change the direction of the shafts near or slightly behind the horse's hind quarters. Shafts 12 and 13 are farther apart at bends 20 than at any other point along their length.

The forwardmost segment 25 of each shaft 12 and 13, which extends from bend 20 to the forward distal end 15, is straight horizontal and directed forwardly and inwardly at a small angle D (shown in FIG. 1) relative to the longitudinal direction of the sulky. This angle can be measured between segment 25 and horizontal longitudinal axis 22, which is drawn tangent to shaft 13 at bend 20 as shown in FIG. 1. Angle C, generally an obtuse angle, between adjacent segments 24 and 25, is also shown in FIG. 1. The sum total of angles B, C and D is 180°. Segment 25 forms a generally longitudinally extending horizontal forward portion of each shaft 12 and 13. (The term "generally longitudinally extending" denotes that the shaft segments 25 do not have to be parallel to the longitudinal centerline (CL), and preferably they are directed slightly laterally inward). The laterally inward direction of segments 25 positions distal ends 15 in close proximity to the front shoulders of the horse, when the horse is positioned between the shafts, for attachment of distal ends 15 to a saddle. This provides an ample amount of clearance between the shafts and sides of the horse for maximum maneuverability of the sulky. The horizontal direction of segments 25, which is generally parallel to the horse's back, allows the horse to pull the sulky shafts in a direction closely matched to the direction of pull exerted parallel to the horses's back rather than pulling shafts that are angled downward. This more efficient horizontal direction of pull reduces the downward pull on the horse, allowing the horse to trot or pace faster. The downward pull of shafts 12 and 13 is minimized, reducing the resultant drag of the sulky, allowing it to be pulled faster.

Sulky 10 further includes a generally U-shaped transverse member 30 positioned normal to the centerline (CL) of the sulky near the back of the sulky. Transverse member 30 has a pair of right angle bends 31 which divide member 30 into a transversely extending horizontal central portion 32 and a pair of vertical downwardly extending end portions 33. The horizontal portion 32 of transverse member 30 intersects shafts 12 and 13 close to and preferably just behind bend 17, and continues laterally beyond the shafts. The shafts 12 and 13 may be secured to the transverse member 30 and particularly to the horizontal portion 32 thereof by conventional means such as welding.

Wheels 34 and 35 are rotatably mounted on the outboard lateral ends of transverse member 30, i.e., at the lower ends of vertical portions 33 of the transverse member. Wheels 34 and 35 rotate about axes 36. The vertical portions 33 of transverse member are on the outboard sides of the wheels. The horizontal portion of transverse member 30 is positioned directly over the axes of wheels 34 and 35; this distributes the weight of the sulky and driver evenly over the wheels to reduce the downward pull of the shafts 12 and 13 at distal ends 15. This allows the horse's energy to be directed primarily to pulling rather than supporting the weight of the sulky. The wide wheel base defined by the distance between vertical portions 33 of transverse member 30 promotes even and accurate tracking behind the horse and eliminates yaw. Even distribution of the weight of the sulky and driver directly over the wheel axes minimizes the vertical load on the horse and improves tracking and maneuverability of the sulky.

With continuing reference to FIG. 1 and FIG. 2, a strut 37 extends from each shaft 12 and 13 near bend 19 to the bottom end of each vertical portion 33 of transverse member 14. The strut terminates at its lower and on the outboard side of a wheel 34 or 35. A bend 38 in each strut 37 is positioned to turn strut 37 radially inward and forward of the forward radius of each wheel extending from transverse ember 14. In addition to lending structural stability and continuity between the shafts 12 and 13 and transverse member 14, strut 37 further serves as a gaging brace to prevent contact of the wheel with the track rail or other sulkies or horses during racing. It should further be noted that the strut 37 is attached to the leading edge of the bottom end of vertical portion 33 of transverse member 14 to minimize air turbulence created at the intersection.

A pair of inboard support struts 40 extend diagonally upwardly from the axes 36 of wheels 34 and 35 on the inboard sides thereof to struts 37, a short distance above bends 38. Struts 40 may be secured to struts 37 by conventional means such as welding struts 40 afford additional structural support and rigidity to the sulky.

A driver's seat 45 is provided or is mounted in the space just behind transverse member 30 and between shafts 12 and 13 and particularly the rearmost segments 21 thereof, as best seen in FIG. 1. The seat 45 may be secured to either the shafts 12 and 13, to the transverse member 30, or both.

A pair of stirrups 50 are mounted on the inboard sides of shafts 12 and 13 just aft of bends 18.

Generally, the structural members (or frame members) of the sulky, i.e, the shafts 12 and 13, transverse member 30, and struts 37 and 40, will be formed from lightweight, strong structural metal such as aluminum, steel, titanium and alloys of these metals. The structural members (or frame members) may, however, be formed from engineering plastics including aramid ("KEVLAR",) polyimides, polyesters, polycarbonates, carbon fibers and the like.

It will be noted that the rear portions (segments 21 and 22) of the shafts 12 and 13 are directly behind the horse, are not outboard of the sides of the horse as in previous sulkies. This gives several advantages, among them less wind resistance and a closer positioning of the stirrups, which results in greater comfort to the driver.

The distance between the forward portions (segment 25) of the shafts 12 and 13 must be sufficient to receive a horse of desired size therebetween. Other dimensions, such as overall length and overall width, may be in accordance with current practice.

The hitch of the present invention has several advantages over sulky hitches known in the art. First, the hitch of this invention provide for quicker fastening of a sulky to a saddle or harness of a horse, and also for quicker unfastening of a sulky from a saddle or harness. Second, because the hitch 100 of this invention is coaxial with the shaft 12 or 13 in which is mounted and does not protrude radially beyond the shaft walls, it has better aerodynamic characteristics than presently known hitches, which typically are mounted on the outside wall of the shaft. Since races are frequently won by as little as a fraction of a second, even a slight improvement in aerodynamic characteristics can significantly affect the outcome of a race. Finally, a hitch 100 of this invention, because of its length, adds to the effective length of the sulky. In a representative embodiment, a hitch 100 of this invention is 8 inches long and the rear section is about 1½ inch long, so that the effective overall length of the sulky is increased by about 6½ inches.

While a preferred embodiment of the invention has been illustrated and described in detail, it will be evident that various changes and modifications may be made with out departing from the scope or spirit of the invention.

What is claimed is:

1. A hitch for insertion into a tubular end of a shaft, said hitch comprising a tapered front portion, a mid-portion and a cylindrical rear portion, the cylindrical rear portion of the hitch being adapted to be received in an open ended tubular end portion of a shaft, said mid-portion including first and second spaced longitudinally extending rigid members which together form longitudinally extending opening means therebetween for receiving an attaching member associated with a harness or saddle.

2. A hitch according to claim 1 wherein (1) said mid-portion is generally cylindrical and of slightly larger diameter of said rear portion so as to form a shoulder for positioning said hitch in the forward end of the shaft; (2) said mid-portion includes first and second end members which adjoins said front and rear portions, respectively; (3) said first longitudinally extending rigid member extends between said first and second end members and is defined by at least one cutout in said mid-portion; (4) said front portion, said rear portion, said end members and said first longitudinally extending rigid member are of one piece integral construction, and (5) said second longitudinally extending rigid member is a rod extending from said front portion to said rear portion and is joined thereto.

3. A hitch according to claim 2 wherein said mid-portion further includes at least one transverse spacer disc which is spaced from said end members.

4. A hitch according to claim 3 wherein said mid-portion includes at least two transverse spacer discs which are spaced from said end members and from each other.

5. A hitch according to claim 3 wherein said first and second end members and said at least one transverse spacer disc are coaxial, of circular cross-sectional shape, and of the same diameter.

6. A racing sulky according to claim 1 wherein (1) said mid-portion is generally cylindrical and of slightly larger diameter of said rear portion so as to form a shoulder for positioning said hitch in the forward end of the shaft; (2) said mid-portion includes first and second end members which adjoins said front and rear portions, respectively; (3) said first longitudinally extending rigid member extends between said first and second end members and is defined by at least one cutout in said mid-portion; (4) said front portion, said rear portion, said end members and said first longitudinally extending rigid member are of one piece integral construction, and (5) said second longitudinally extending rigid member is a rod extending from said front portion to said rear portion and is joined thereto.

7. A racing sulky according to claim 6 wherein said mid-portion further includes at least one transverse spacer disc which is spaced from said end members.

8. A racing sulky according to claim 7 wherein said mid-portion includes at least two transverse spacer discs which are spaced from said end members and from each other.

9. A racing sulky according to claim 7 wherein said front and rear end members and said at least one transverse spacer disc are coaxial, of circular cross-sectional shape and of the same diameter.

10. A racing sulky comprising two spaced apart generally longitudinally extending shafts, each of said shafts having a tubular forward end portion which terminates in an open forward end, a transverse member, and a pair of wheels rotatably mounted on said transverse member, each of said shafts being fixably secured to said transverse member;

and a pair of hitches for securing said sulky to a harness or saddle of a horse, each of said hitches including a tapered front portion, a mid-portion and a cylindrical rear portion, the cylindrical rear portions of said hitches being received in the respective open forward ends of said shafts, said mid-portion including first and second longitudinally extending rigid members which together form longitudinally extending opening means therebetween for receiving an attaching member associated with a harness or saddle.

* * * * *